(12) United States Patent
Moriya et al.

(10) Patent No.: US 11,524,677 B2
(45) Date of Patent: Dec. 13, 2022

(54) HYBRID ELECTRIC VEHICLE

(71) Applicant: SUBARU CORPORATION, Tokyo (JP)

(72) Inventors: Fumiyuki Moriya, Tokyo (JP); Masatoshi Kishikawa, Tokyo (JP); Atsushi Doki, Tokyo (JP); Hirofumi Yabe, Tokyo (JP); Takumi Hoshi, Tokyo (JP); Masaki Komuro, Tokyo (JP); Tetsu Matsuzaki, Tokyo (JP); Jun Oosawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/375,553

(22) Filed: Jul. 14, 2021

(65) Prior Publication Data

US 2022/0024443 A1 Jan. 27, 2022

(30) Foreign Application Priority Data

Jul. 21, 2020 (JP) .............................. JP2020-124105

(51) Int. Cl.
| | |
|---|---|
| *B60W 20/15* | (2016.01) |
| *B60K 6/24* | (2007.10) |
| *B60K 6/26* | (2007.10) |
| *B60W 30/182* | (2020.01) |
| *B60K 6/28* | (2007.10) |
| *B60W 20/19* | (2016.01) |

(52) U.S. Cl.
CPC .............. *B60W 20/15* (2016.01); *B60K 6/24* (2013.01); *B60K 6/26* (2013.01); *B60K 6/28* (2013.01); *B60W 20/19* (2016.01); *B60W 30/182* (2013.01); *B60Y 2200/92* (2013.01); *B60Y 2300/182* (2013.01)

(58) Field of Classification Search
CPC ...... B60W 20/10; B60W 20/11; B60W 20/15; B60W 20/19; B60W 30/182
See application file for complete search history.

(56) References Cited

U.S. PATENT DOCUMENTS

2004/0163860 A1\* 8/2004 Matsuzaki ............... B60K 6/44
290/46
2014/0180441 A1\* 6/2014 Hiasa .................... B60W 10/06
700/22

FOREIGN PATENT DOCUMENTS

JP 2012-066747 A 4/2012

\* cited by examiner

*Primary Examiner* — Robert A Werner
(74) *Attorney, Agent, or Firm* — McDermott Will & Emery LLP

(57) ABSTRACT

A hybrid electric vehicle includes an engine, a motor, a battery, a coupling mechanism, an electric power generating mechanism, and a vehicle controller. The engine and motor drive driving wheels. The battery supplies electric power for running to the motor. The coupling mechanism switches coupling of the engine and the driving wheels between direct coupling and buffering coupling. The electric power generating mechanism generates electric power. The vehicle controller switches a running mode of the hybrid electric vehicle between a first running mode and a second running mode with higher running performance. The vehicle controller limits the electric power generation under a first condition when the buffering coupling is applied during the first running mode and limits the electric power generation under a second condition less limited than the first condition when the buffering coupling is applied during the second running mode.

17 Claims, 4 Drawing Sheets

HYBRID ELECTRIC VEHICLE

CROSS-REFERENCE TO RELATED APPLICATIONS

The present application claims priority from Japanese Patent Application No. 2020-124105 filed on Jul. 21, 2020, the entire contents of which are hereby incorporated by reference.

BACKGROUND

The disclosure relates to a hybrid electric vehicle having a running mode that increases running performance.

A hybrid electric vehicle (HEV), which includes a motor and an engine, illustrated in Japanese Unexamined Patent Application Publication No. 2012-66747, has a running mode that increases bad road running performance. During this running mode, the vehicle prohibits driving of the motor alone and drives both the motor and the engine.

SUMMARY

An aspect of the disclosure provides a hybrid electric vehicle including an engine, a motor, a battery, a coupling mechanism, an electric power generating mechanism, and a vehicle controller. The engine and a motor are configured to drive driving wheels. The battery is configured to supply electric power for running to the motor. The coupling mechanism is located on a torque transmission route between the engine and the driving wheels and configured to switch coupling of the engine and the driving wheels between direct coupling and buffering coupling. The electric power generating mechanism is configured to generate electric power from torque transmitted from the engine via the coupling mechanism. The vehicle controller is configured to switch a running mode of the hybrid electric vehicle between a first running mode and a second running mode to which an accelerator operation map that increases running performance compared with the first running mode is applied. The vehicle controller limits electric power generation of the electric power generating mechanism under a first condition when the buffering coupling is applied during the first running mode and limits electric power generation of the electric power generating mechanism under a second condition that is less limited than the first condition when the buffering coupling is applied during the second running mode.

An aspect of the disclosure provides a hybrid electric vehicle including an engine, a motor, a battery, a coupling mechanism, an electric power generating mechanism, and circuitry. The engine and a motor are configured to drive driving wheels. The battery is configured to supply electric power for running to the motor. The coupling mechanism is located on a torque transmission route between the engine and the driving wheels and configured to switch coupling of the engine and the driving wheels between direct coupling and buffering coupling. The electric power generating mechanism is configured to generate electric power from torque transmitted from the engine via the coupling mechanism. The circuitry is configured to switch a running mode of the hybrid electric vehicle between a first running mode and a second running mode to which an accelerator operation map that increases running performance compared with the first running mode is applied, and limit electric power generation of the electric power generating mechanism under a first condition when the buffering coupling is applied during the first running mode and limit electric power generation of the electric power generating mechanism under a second condition that is less limited than the first condition when the buffering coupling is applied during the second running mode.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

The electric vehicle of the related art has room for improvement in the control of the running mode that increases running performance. For example, the electric vehicle has the following issue.

In general, the power from the engine is transmitted to driving wheels via a torque converter that implements an amplifying function and a buffering function on torque transmission. In addition, the torque converter may have a lock-up mechanism that can switch coupling having the buffering function and the amplifying function to direct coupling. In an HEV in which electric power is generated by using part of the power from the engine, an electric power generating mechanism receives the power transmitted from the engine via the torque converter. Since energy loss occurs when the lock-up mechanism of the torque converter is open (not direct coupling), the HEV of the related art may prohibit electric power generation when the lock-up mechanism of the torque converter is open. On the other hand, in the running mode that increases running performance, a motor that can output power with high responsivity is widely used. Furthermore, since the load on the engine may change greatly in the running mode that increases running performance, the lock-up mechanism of the torque converter is made open.

Therefore, in the HEV of the related art, in the running mode that increases running performance, while the motor consumes electric power, the electric power generation is limited by the lock-up mechanism being made open. As a result, generation and consumption of electric power are not balanced.

It is desirable to provide a hybrid electric vehicle in which control appropriate for a running mode that increases running performance can be performed.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
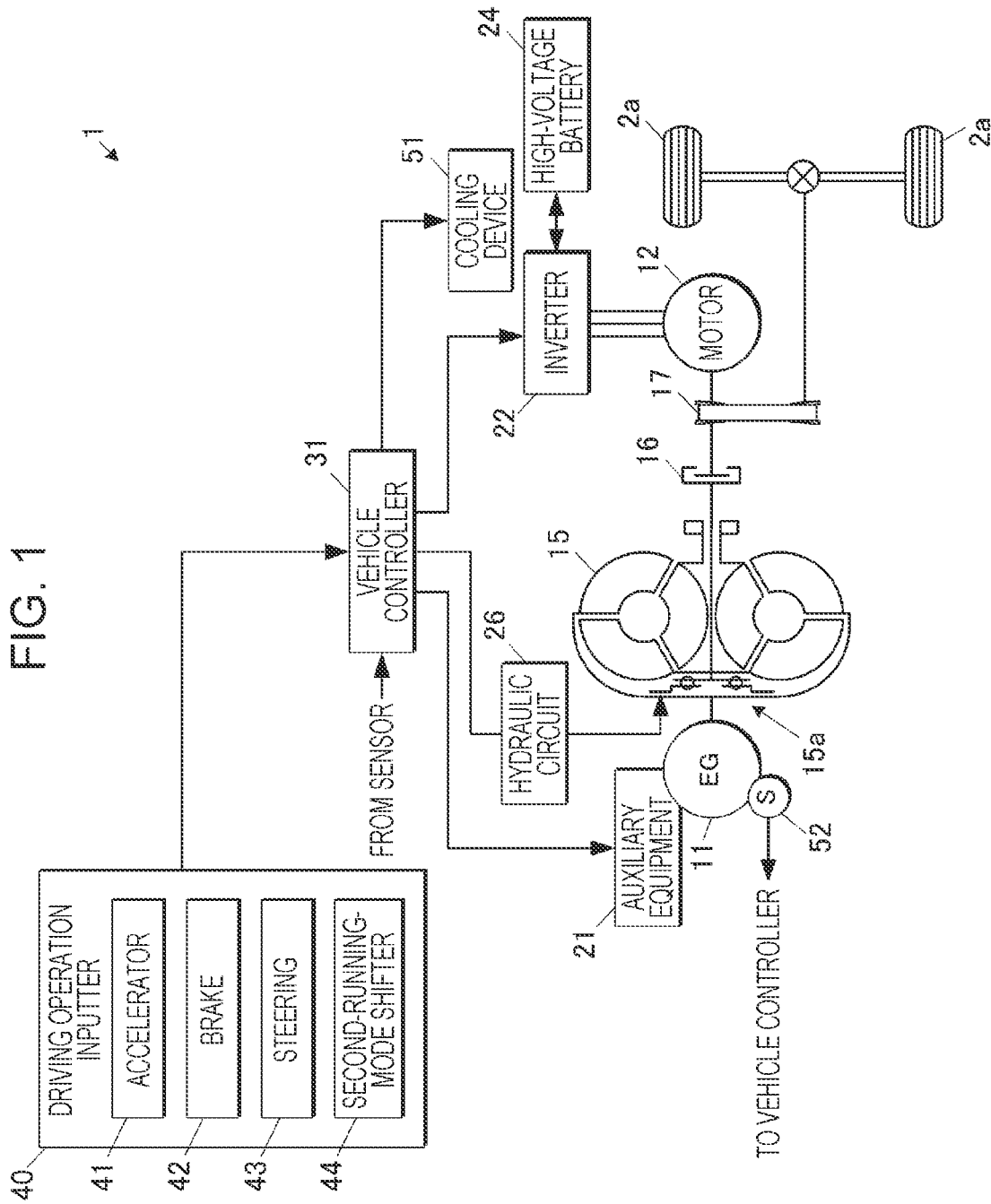
FIG. 1 is a block diagram illustrating an electric vehicle according to an embodiment of the disclosure.

FIG. 1 illustrates an electric vehicle 1 according to the embodiment of the disclosure. The electric vehicle 1 is an HEV and includes driving wheels 2a, an engine 11, a motor 12, a torque converter 15, a continuously variable transmission 17, and an input clutch 16. The engine 11 is an internal combustion engine, the motor 12 is an electric motor, the torque converter 15 and the continuously variable transmission 17 are located on a route on which torque is transmitted from the engine 11 to the driving wheels 2a, and the input clutch 16 can separate the engine 11 during electric vehicle (EV) running. The EV running means running using the power from the motor 12 alone. Among the above components, in one embodiment, the torque converter 15 may serve as a "coupling mechanism". In one embodiment, the motor 12 may serve as an "electric power generating mechanism".

The torque converter 15 includes a lock-up mechanism 15a. When the lock-up mechanism 15a is open, the torque converter 15 couples the input shaft and the output shaft such that torque transmission with hydraulic oil implements the torque amplifying function and the torque buffering function. On the other hand, when the lock-up mechanism 15a is closed, the torque converter 15 directly couples the input shaft and the output shaft. In one embodiment, the coupling with the lock-up mechanism 15a open may serve as "buffering coupling", and the coupling with the lock-up mechanism 15a closed may serve as "direct coupling".

The motor 12 is disposed such that torque can be transmitted to the driving wheels 2a without the torque converter 15. The input clutch 16 is provided between the continuously variable transmission 17 and the torque converter 15.

In the electric vehicle 1, upon power being output from the engine 11, the power is transmitted to the driving wheels 2a via the torque converter 15 and the continuously variable transmission 17. When the lock-up mechanism 15a is open, the power from the engine 11 is transmitted by being subjected to the torque amplifying function and the torque buffering function implemented by the torque converter 15. At this time, in the torque converter 15, energy loss occurs by the flow of hydraulic oil therein. When the lock-up mechanism 15a is closed, the power from the engine 11 is directly transmitted without being subjected to the amplifying function and the buffering function. Furthermore, upon power being output from the motor 12, the power is transmitted to the driving wheels 2a via the continuously variable transmission 17. When both the engine 11 and the motor 12 are driven, the power from the engine 11 and the power from the motor 12 are combined to be transmitted to the driving wheels 2a. In a case in which the electric vehicle 1 runs by using the power from the motor 12 alone, the input clutch 16 is separated, and thereby, the power can be transmitted from the motor 12 to the driving wheels 2a with the friction of the engine 11 excluded. Furthermore, a power that is greater than or equal to a requested power for running is output from the engine 11, and the motor 12 absorbs a power beyond the requested power by a regenerative operation, and thus, the motor 12 can generate electric power to charge a high-voltage battery 24.

The electric vehicle 1 further includes auxiliary equipment 21 for driving the engine 11, an inverter 22 for driving the motor 12, the high-voltage battery 24, a hydraulic circuit 26, a vehicle controller 31, and a driving operation inputter 40. The high-voltage battery 24 supplies electric power for running to the motor 12 and, in one example, may serve as a "battery". The hydraulic circuit 26 drives the lock-up mechanism 15a of the torque converter 15. The vehicle controller 31 controls the auxiliary equipment 21, the inverter 22, and the hydraulic circuit 26. The driving operation inputter 40 is operable by a driver. The driving operation inputter 40 includes an accelerator 41, a brake 42, a steering 43, and a second-running-mode shifter 44 for switching the running mode. The operation amount of the accelerator 41 and the operation information of the second-running-mode shifter 44 are transmitted to the vehicle controller 31. In one embodiment, the vehicle controller 31 may serve as a "vehicle controller" and a charge/discharge controller.

The electric vehicle 1 further includes a cooling device 51 and a sensor 52. The cooling device 51 cools an electrical system (the high-voltage battery 24 and the inverter 22), and the sensor 52 detects a cooling status of the engine 11 (e.g., water-temperature gauge of engine cooling water). Output of the sensor 52 is transmitted to the vehicle controller 31, and the vehicle controller 31 can control the cooling strength of the cooling device 51.

The vehicle controller 31 includes a single electronic control unit (ECU) or a plurality of ECUs that operate in cooperation. The vehicle controller 31 may also include a battery control ECU that manages charge/discharge of the high-voltage battery 24. By a central processing unit (CPU) in the ECU executing a control program, the vehicle controller 31 controls operations of the engine 11, the motor 12, and the lock-up mechanism 15a of the torque converter 15 in accordance with a driving operation and a state of each component of the electric vehicle 1.

The vehicle controller 31 can switch the running mode of the electric vehicle 1 between a first running mode and a second running mode that increases running performance compared with the first running mode.

The first running mode is suitable for running on a normal paved road without snow or mud and may be a normal running mode, an intelligence running mode in which power output characteristics in response to an accelerator operation are more gentle than those in the normal running mode, or a sports mode in which the power output characteristics in response to an accelerator operation are more steep than those in the normal running mode.

The second running mode is suitable for running on a bad road such as a snowy road, a muddy road, or a gravel road. An accelerator operation map (may also referred to as accelerator opening map) that increases running performance compared with the first running mode is applied to the second running mode. The accelerator operation map means a map representing power output characteristics in response to an accelerator operation. The second running mode may include two modes, which are Mode A for running with idle running of the driving wheels 2a suppressed on a bad road and Mode B for getting out of deep snow or mud, and the accelerator operation map for Mode A and the accelerator operation map for Mode B may differ from each other. For example, the accelerator operation map for Mode A may be a map by which a small power is output even when a great accelerator operation is performed compared with the accelerator operation map for the first running mode. The accelerator operation map for Mode B may be a map by which a large power is likely to be output at a low speed compared with the accelerator operation map for the first running mode. In addition to the change of the accelerator operation map, during the second running mode, parameters for traction control, the control method of the control device, the number of driving wheels 2a, or the method for distributing power to the driving wheels 2a may be changed from those during the first running mode in order to increase running performance. Although the first running mode has no limitation on the vehicle speed, the second running mode may be selectable at low vehicle speeds, such as 40 km/h or less, for example.

Control of Limitation on Electric Power Generation

Between the first running mode and the second running mode, the vehicle controller 31 switches the running power (switch driving of the engine 11 and the motor 12), the state of the lock-up mechanism 15a, and limitation on electric power generation using the power from the engine 11, as illustrated in the following function table 1.

FUNCTION TABLE 1

|  | First Running Mode | Second Running Mode |
| --- | --- | --- |
| Running Power | Driving of Engine Alone, Driving of Motor Alone, and Driving of Both Are Appropriately Switched | Engine and Is Continuously Driven, and Driving of Motor Is Appropriately Switched |
| Lock-Up Mechanism | Close/Open Is Switched Depending on Running State | Continuously Open |
| Limitation on Electric Power Generation When Lock-Up Mechanism Is Open | Electric Power Generation Is Prohibited, or Electric Power Limit Is Small, and Change Limit Is Small | Electric Power Generation Is Permitted, Electric Power Limit Is Large, and Change Limit Is Large |
| Limitation on Electric Power Generation When Lock-Up Mechanism Is Closed | Electric Power Generation Is Permitted, Electric Power Limit Is Small or Medium, and Change Limit Is Small or Medium | Not Limited |

In the table, "Electric Power Limit" means a permitted maximum electric power to be generated, "Change Limit" means a limit of a temporal change in the generated electric power, and "Limitation on Electric Power Generation When Lock-Up Mechanism Is Open" and "Limitation on Electric Power Generation When Lock-Up Mechanism Is Closed" mean limitations on electric power generation when the lock-up mechanism 15a is open and closed. In the function table 1, in one embodiment, the content in "First Running Mode"-"Limitation on Electric Power Generation When Lock-Up Mechanism Is Open" may serve as a "first condition", and the content in "Second Running Mode" "Limitation on Electric Power Generation When Lock-Up Mechanism Is Open" may serve as a "second condition".

During the second running mode, depending on the state of a bad road and the movement of the vehicle, a driver may operate the accelerator 41 roughly and greatly, in which case, the requested power to be output to the driving wheels 2a also changes roughly and greatly. When the requested power is large, the vehicle controller 31 increases a power ratio of the motor 12 so that the sum of the power from the motor 12 and the power from the engine 11 can satisfy the requested power. On the other hand, when the requested power is small, the vehicle controller 31 causes the motor 12 to perform a regenerative operation under control of the inverter 22 and causes the motor 12 to generate a negative torque so that the sum of the power from the engine 11 and the negative power from the motor 12 can satisfy the small requested power. At this time, the motor 12 generates electric power by the regenerative operation, and the high-voltage battery 24 is charged with the generated electric power.

During the second running mode, as illustrated in the above table, since the electric power limit is set to a large value, when the requested power to be output to the driving wheels 2a is small, a large electric power can be generated, and the high-voltage battery 24 can be charged with the large electric power. Furthermore, since the change limit is set to a large value, even in a case in which the requested power changes roughly, when the requested power is small, the electric power limit can be quickly changed to a large value, and a large electric power can be generated. Accordingly, even in a case in which the motor 12 consumes a large electric power, the high-voltage battery 24 can be charged with the large electric power, and the balance between generation and consumption of electric power can be maintained.

Cooling Control and Control of Limitation on Electric Power Generation Based on Cooling Status of Engine Between the first running mode and the second running mode, the vehicle controller 31 further switches cooling control of the electrical system and control of limitation on electric power generation based on the cooling status of the engine 11, as illustrated in the following function table 2.

FUNCTION TABLE 2

|  | First Running Mode (When Lock-Up Mechanism Is Closed) | Second Running Mode |
| --- | --- | --- |
| Electrical System Cooling Control | With Respect to Temperature: 50° C. to 95° C., Cooling Strength: 10% to 100% | With Respect to Temperature: 50° C. to 80° C., Cooling Strength: 10% to 100% |
| Control of Limitation on Electric Power Generation Based on Cooling Status of Engine | Not Performed | With Respect to Cooling Status of Engine: Strong to Weak, Electric Power Limit: Large to Small |

In the table, "Electrical System" mainly corresponds to the high-voltage battery 24 and the inverter 22. The electrical system is cooled by air cooling or liquid cooling, or both, and "Cooling Strength" in the table is controlled by a driving duty of an air cooling fan or a driving duty of a liquid cooling pump, or both. The cooling device 51 in FIG. 1 corresponds to the air cooling fan and the liquid cooling pump. In the table, "Cooling Status of Engine" means a cooling degree of the engine 11 and a degree of cooling performance of the engine 11, and can be obtained from, for example, the temperature of the engine cooling water, the outside air temperature, the intake air temperature, the exhaust temperature, the vehicle speed, alone or in combination. The sensor 52 in FIG. 1 corresponds to a sensor of any of the above temperatures or a vehicle speed sensor. In the function table 2, in one embodiment, the content in "Second Running Mode" "Control of Limitation on Electric Power Generation Based on Cooling Status of Engine" may serve as a "second condition".

During the second running mode, it is assumed that an accelerator operation is performed roughly and greatly, and, in accordance with this, great charge/discharge of the high-voltage battery 24 is performed frequently, and the electrical system is likely to generate heat compared with during the first running mode. Accordingly, according to the above cooling control, since the cooling of the electrical system is reinforced during the second running mode, the electrical system can be prevented from being overheated.

In addition, during the second running mode, since the engine 11 is driven at a low speed and output of the engine 11 is increased for electric power generation, it is assumed that the temperature of the engine 11 becomes high even if the engine 11 is cooled at the maximum degree. Accordingly, as described above, by changing the electric power limit in accordance with the cooling status of the engine 11 during the second running mode, when the temperature of the engine 11 becomes high, the vehicle controller 31 can reduce the load on the engine 11, and thereby, the engine 11 can be prevented from being overheated. Note that, in a case in which the cooling strength of the engine 11 is changeable, during the second running mode, control may also be performed such that the cooling strength of the engine 11 is quickly increased compared with during the first running mode.

Figure 2:
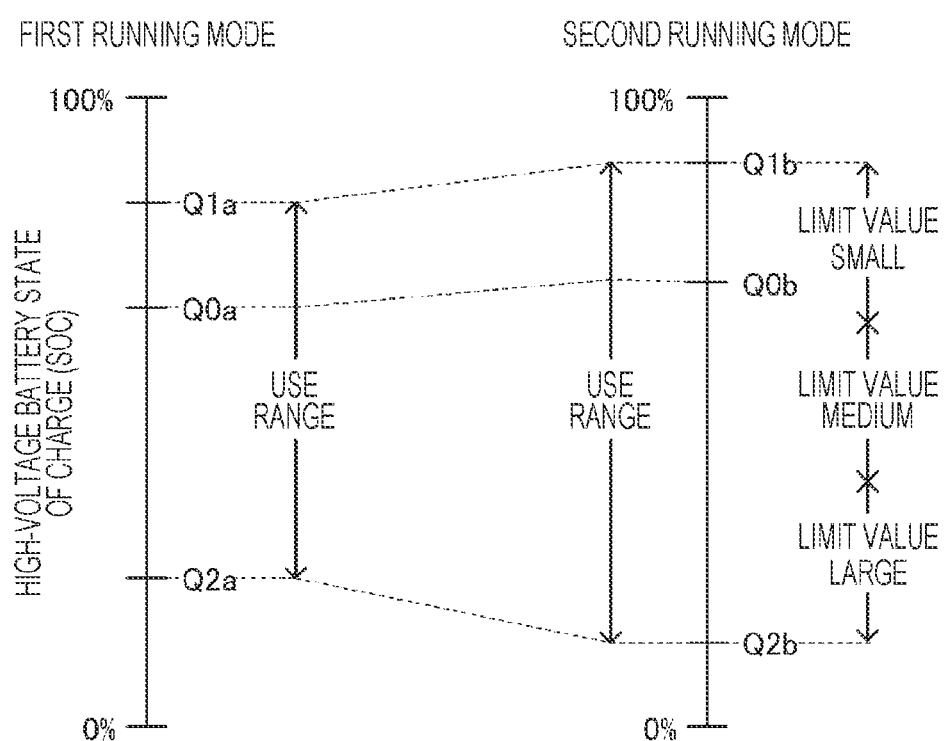
FIG. 2 illustrates a relationship between a state of charge (SOC) of a high-voltage battery and charge/discharge control.

Charge/Discharge Control of High-Voltage Battery FIG. 2 illustrates a relationship between the SOC of the high-voltage battery 24 and charge/discharge control. As illustrated in FIG. 2, the vehicle controller 31 switches the charge/discharge control of the high-voltage battery 24 between the first running mode and the second running mode. For example, first, regarding SOC upper limit values Q1a and Q1b to which the high-voltage battery 24 can be charged, the vehicle controller 31 sets the upper limit value Q1b for the second running mode to a larger value than the upper limit value Q1a for the first running mode. Furthermore, regarding SOC lower limit values Q2a and Q2b to which the high-voltage battery 24 can be discharged, the vehicle controller 31 sets the lower limit value Q2b for the second running mode to a smaller value than the lower limit value Q2a for the first running mode. By such setting, the use range of the SOC of the high-voltage battery 24 is wider for the second running mode than for the first running mode.

Furthermore, regarding SOC central values Q0a and Q0b to be used as thresholds to determine whether to make a charge request or a discharge request in a running state in which both charge and discharge are selectable, the vehicle controller 31 sets the central value Q0b for the second running mode to a larger value than the central value Q0a for the first running mode. By such setting, it is unlikely that the SOC of the high-voltage battery 24 is exhausted even when great discharge and great charge are repeated during the second running mode.

Furthermore, the vehicle controller 31 performs control such that the electric power limit changes depending on the SOC of the high-voltage battery 24 so that a larger electric power can be generated as the SOC is smaller. By such control, it is unlikely that the SOC of the high-voltage battery 24 is exhausted even when great discharge and great charge are repeated during the second running mode.

Running Mode Switching Process

Figure 3:
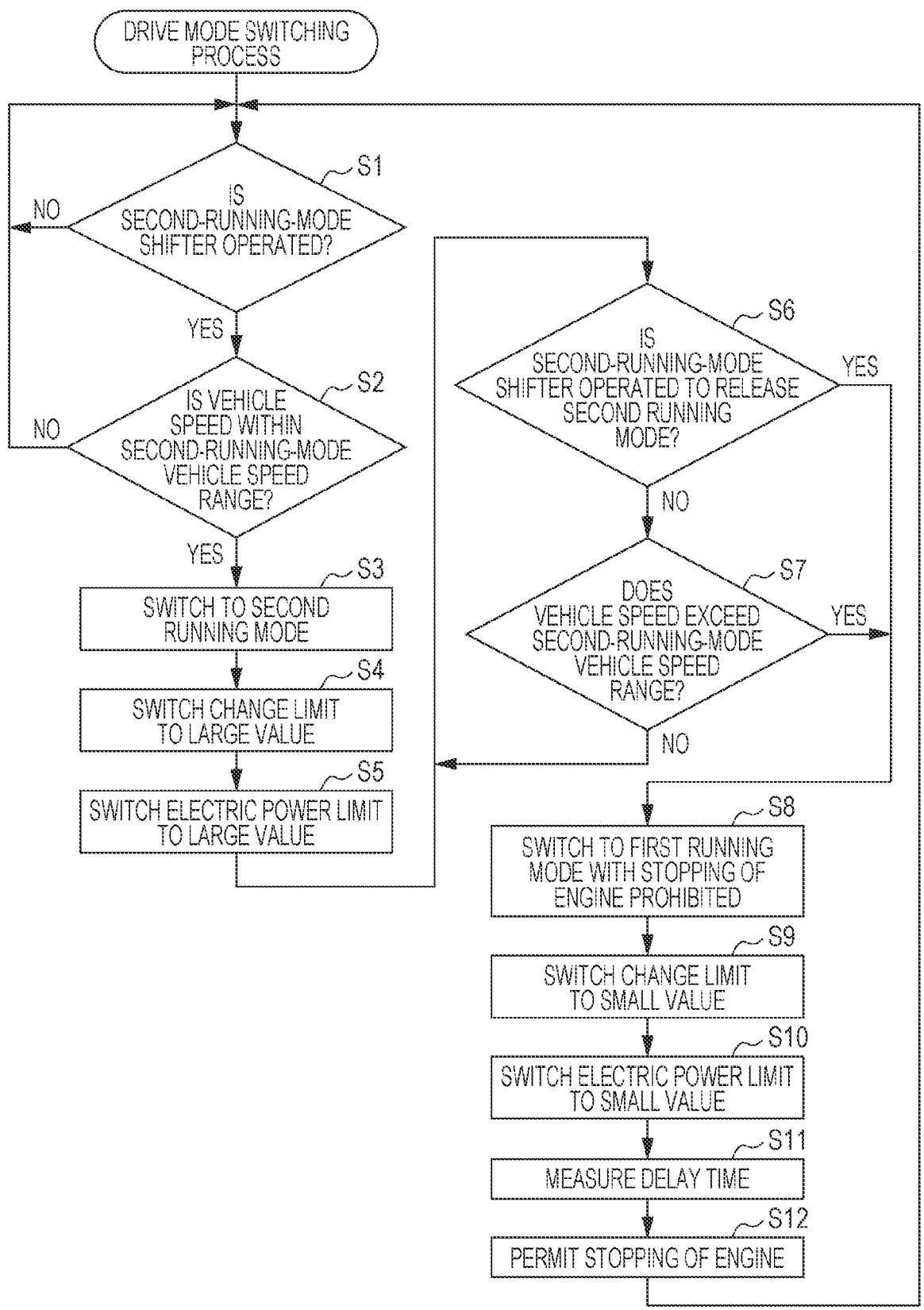
FIG. 3 is a flowchart illustrating a running mode switching process performed by a vehicle controller.

FIG. 3 is a flowchart illustrating a running mode switching process performed by the vehicle controller 31. The vehicle controller 31 performs the running mode switching process while the electric vehicle 1 is active. In this process, if a driver operates the second-running-mode shifter (YES in step S1), and if the vehicle speed is within a second-running-mode vehicle speed range (YES in step S2), the vehicle controller 31 switches the running mode to the second running mode (step S3). By step S3, the engine 11 is driven if having been stopped immediately before the running mode is switched to the second running mode, or the lock-up mechanism 15a is switched to be open if having been closed immediately before the running mode is switched to the second running mode. In addition, the accelerator operation map is switched to that for the second running mode, and, parameters for traction control, the control method of the control device, and the method for distributing power to the driving wheels 2a are switched to those for the second running mode.

Immediately after the switching in step S3, the vehicle controller 31 switches the change limit to a large value (step S4). In addition, immediately after the switching in step S3, the vehicle controller 31 switches the electric power limit to a large value (step S5). Note that the vehicle controller 31 may alternatively perform step S5 after a delay time. By the switching in steps S4 and S5, subsequently, by an electric power generation control process performed concurrently, the vehicle controller 31 causes electric power generation under the condition of limitation on electric power generation for the second running mode and causes the high-voltage battery 24 to be charged. In the above electric power generation control process, in accordance with the driver's driving operation, the SOC of the high-voltage battery 24, and the vehicle state such as the cooling status of the engine 11, the vehicle controller 31 determines the electric power to be generated and performs a process for generating the electric power and charging the high-voltage battery 24.

After the shift to the second running mode, if the driver operates the second-running-mode shifter 44 to release the second running mode (YES in step S6), or if the vehicle speed exceeds the second-running-mode vehicle speed range (YES in step S7), while the stopping of the engine 11 is prohibited, the vehicle controller 31 switches the other control content of the running mode to that for the first running mode (step S8). By step S8, the lock-up mechanism 15a is set so as to be closed in accordance with the running state, and the accelerator operation map is switched to that for the first running mode. In addition, parameters for traction control, the control method of the control device, and the method for distributing power to the driving wheels 2a are switched to those for the first running mode.

Immediately after the switching in step S8, the vehicle controller 31 switches the change limit to a small value (step S9). In addition, immediately after the switching in step S8, the vehicle controller 31 switches the electric power limit to a small value (step S10). Note that the vehicle controller 31 may alternatively perform the switching in step S9 and S10 after a delay time. By the switching in steps S9 and S10, subsequently, by an electric power generation control process performed concurrently, the vehicle controller 31 causes electric power generation under the condition of limitation on electric power generation for the first running mode and causes the high-voltage battery 24 to be charged. In the above electric power generation control process, in accordance with the driver's driving operation, the SOC of the high-voltage battery 24, and the vehicle state such as the cooling status of the engine 11, the vehicle controller 31 determines the electric power to be generated and performs a process for generating the electric power and charging the high-voltage battery 24.

Subsequently, the vehicle controller 31 measures a delay time (e.g., a few seconds) (step S11) and then switches the stopping of the engine 11 to be permitted (step S12). By the switching, for example, if the SOC of the high-voltage battery 24 is high, the engine 11 can be stopped to shift to EV running. If the lock-up mechanism 15a is closed after the switching in step S8 before the delay time elapses, the vehicle controller 31 may permit the stopping of the engine 11 without waiting for the delay time.

By such a running mode switching process, the first running mode and the second running mode can be switched.

Figure 4:
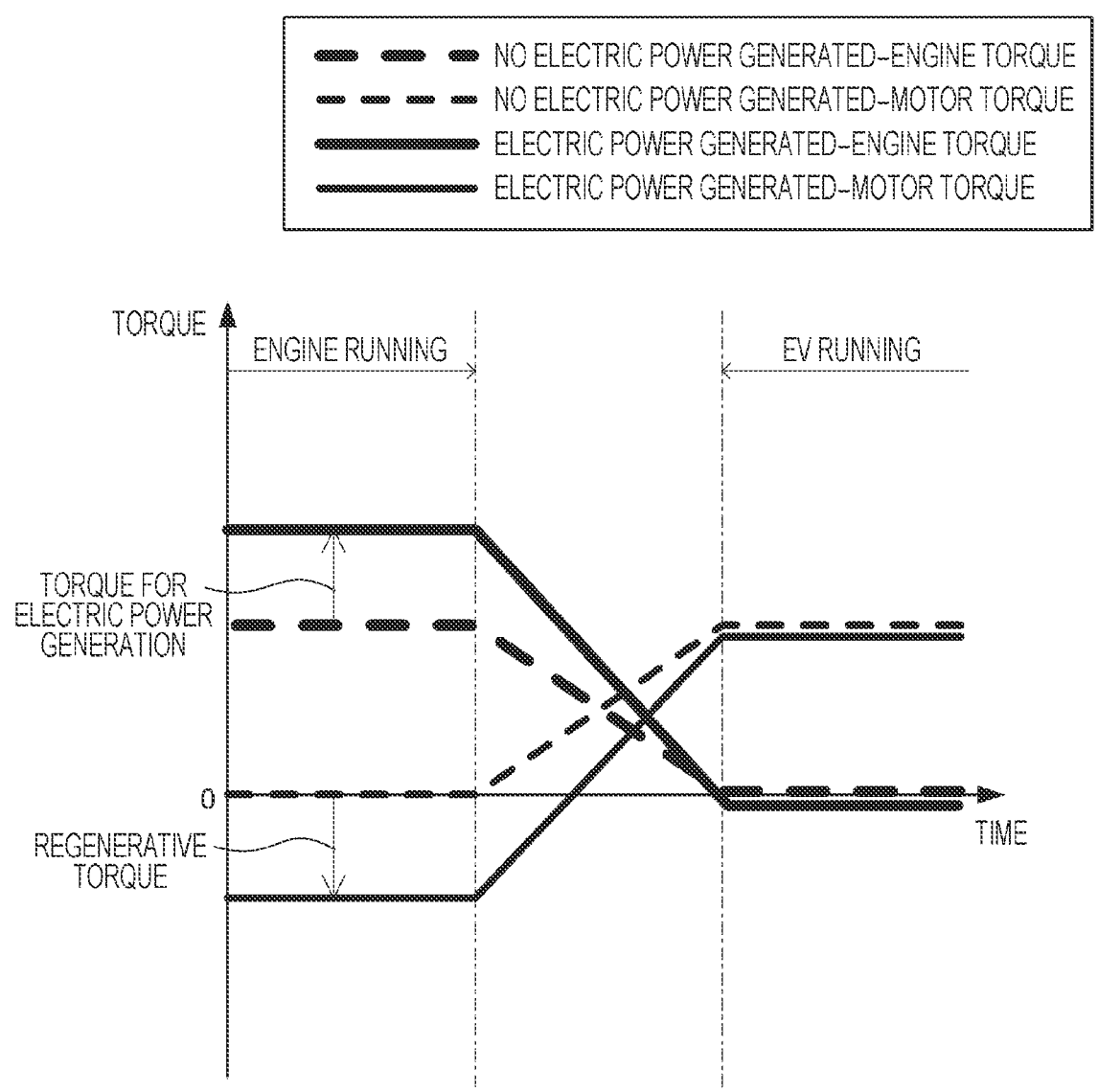
FIG. 4 is a time chart illustrating a temporal change of torque when engine running shifts to EV running.

Next, the intention of the delay process in step S11 in the running mode switching process will be described. FIG. 4 is a time chart illustrating a temporal change of torque when engine running shifts to EV running. The time chart illustrates the temporal change of torque when no electric power is generated and when electric power is generated.

As illustrated in the time chart in FIG. 4, when engine running is switched to EV running, the torque of the engine 11 is gradually decreased from a positive value to zero, and, at the same time, the torque of the motor 12 is gradually increased so that the total value of both torques does not fluctuate. Such torque control realizes switching to the EV running without acceleration fluctuation in the electric vehicle 1. At the time of torque control, the vehicle controller 31 calculates the torque of the engine 11 (torque via the torque converter 15) on the basis of driving parameters of the engine 11. The torque of the engine 11 can be calculated comparatively accurately when the lock-up mechanism 15a is closed. However, it is difficult to accurately calculate the torque when the lock-up mechanism 15a is open because an estimation error occurs in a torque amplification amount in the torque converter 15. When the calculated torque of the engine 11 includes an error, the total torque of the engine 11 and the motor 12 does not become constant, and acceleration fluctuation in the electric vehicle 1 occurs at the switching to the EV running, and thus, the driver feels strange.

As illustrated in a broken line in FIG. 4, the above error is relatively reduced if the torque of the engine 11 before the switching to EV running is small. However, in a case in which electric power is generated during the second running mode, as illustrated in a solid line in FIG. 4, a negative regenerative torque occurs in the motor 12, and the torque for electric power generation is added to the torque of the engine 11. Thus, the torque output from the engine 11 is increased. Therefore, if engine running is switched to EV running in such a state, a large error occurs in the calculated torque of the engine 11, and a large acceleration fluctuation occurs in the electric vehicle 1 at the switching to EV running.

In contrast, by the delay process (step S11) in FIG. 3, the amount of generated electric power is reduced in accordance with the limitation on electric power generation for the first running mode during the delay, and, in accordance with this, the torque of the engine 11 is reduced. For example, during engine running in FIG. 4, the status transitions from the solid-line torque to the broken-line torque. Accordingly, by the switching to EV running subsequently, the error of the calculated torque of the engine 11 is reduced, and a great acceleration fluctuation in the electric vehicle 1 can be suppressed. This is the intention of the above delay process.

As described above, in the electric vehicle 1 according to this embodiment, the condition of limitation on electric power generation is more relaxed when the lock-up mechanism 15a is open during the second running mode that increases running performance than when the lock-up mechanism 15a is open during the first running mode. Accordingly, electric power is likely to be generated also during the second running mode, and generation and consumption of electric power can be more balanced during the second running mode. Thus, vehicle control appropriate for the second running mode is performed.

Furthermore, in the electric vehicle 1 according to this embodiment, the electric power limit and the change limit during the second running mode are set to larger values than those when the lock-up mechanism 15a is open during the first running mode. Accordingly, even in a case in which the requested power to be output changes abruptly during the second running mode, a large electric power can be generated quickly. Thus, generation and consumption of electric power can be even more balanced during the second running mode.

Furthermore, in the electric vehicle 1 according to this embodiment, the electric power limit during the second running mode changes depending on the cooling status of the engine 11. In a case in which a sufficient electric power is generated during the second running mode, it is assumed that a larger load is added to the engine 11 that is driven at low speed, and the engine 11 generates more heat. Accordingly, with the above configuration, since the generated electric power can be suppressed in accordance with the cooling status of the engine 11, excessive heat generation of the engine 11 caused by electric power generation during the second running mode can be prevented.

Furthermore, in the electric vehicle 1 according to this embodiment, the vehicle controller 31 controls the use range of the high-voltage battery 24 (the range from the SOC upper limit values Q1$a$ and Q1$b$ to the SOC lower limit values Q2$a$ and Q2$b$, FIG. 2) such that the use range is wider for the second running mode than for the first running mode. With this control, during the second running mode that increases running performance, by the accelerator 41 being operated abruptly and the motor 12 repeating consumption and generation of a comparatively large electric power, even in a case in which the SOC of the high-voltage battery 24 fluctuates greatly, the fluctuation can be overcome by the wide use range of the high-voltage battery 24.

Furthermore, in the electric vehicle 1 according to this embodiment, when the second running mode is switched to the first running mode, the vehicle controller 31 delays a timing at which the stopping of the engine 11 is switched to be permitted. In this embodiment, since a comparatively large electric power is generated during the second running mode, when the second running mode is switched to the first running mode, a request for switching from engine running to EV running may be generated for the high SOC of the high-voltage battery 24. In such a case, as described with reference to FIG. 4, since the output of the engine 11 is reduced by the above delay process before switching to EV running, the error included in the estimated torque of the engine 11 can be reduced, and acceleration fluctuation in the electric vehicle 1 based on the error can be reduced.

Although the embodiment of the disclosure has been described above, the disclosure is not limited thereto. For example, although the embodiment illustrates the torque converter 15 with the lock-up mechanism 15a as the coupling mechanism, any kind of coupling mechanism may be employed as long as the coupling mechanism can switch between the buffering coupling and the direct coupling. In addition, although the above embodiment uses the limit values such as the electric power limit and the change limit for the condition concerning electric power generation, the possibility of a request may also be used instead of the limits. Relaxation of limitation on electric power generation is equivalent to increase of the possibility of a request for electric power generation. Accordingly, description of the relaxation of limitation herein may be interpreted as the increase of the possibility of the request. Furthermore, although the above embodiment illustrates the example in FIG. 1 as a power transmission route from the engine 11 to the motor 12, the power transmission route is changeable in various manners. For example, the engine may be coupled to front wheels, the motor may be coupled to rear wheels, and the power may be transmitted from the engine to the motor via the front wheels, the running road, and the rear wheels. Furthermore, although the above embodiment illustrates the example in which the shift to the second running mode is implemented by a driver's operation, the shift method is changeable in various manners. For example, the controller of the electric vehicle may determine a bad road and may automatically shift to the second running mode. Details described in the embodiment other than the above details are changeable as appropriate without departing from the spirit of the disclosure.

According to an embodiment of the disclosure, even if the buffering coupling is applied during the second running mode that increases running performance, since electric power generation of the electric power generating mechanism is limited under the less-limited second condition, electric power is more likely to be generated than during the first running mode, and generation and consumption of electric power can be balanced despite electric power consumption of the motor and electric power generation of the electric power generating mechanism. Thus, vehicle control appropriate for the second running mode that increases running performance is performed.

The vehicle controller 31 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle controller 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A hybrid electric vehicle comprising:
an engine and a motor configured to drive driving wheels;
a battery configured to supply electric power for running to the motor;
a coupling mechanism that is located on a torque transmission route between the engine and the driving wheels and configured to switch coupling of the engine and the driving wheels between direct coupling and buffering coupling;
an electric power generating mechanism configured to generate electric power from torque transmitted from the engine via the coupling mechanism; and
a vehicle controller configured to switch a running mode of the hybrid electric vehicle between a first running mode and a second running mode to which an accelerator operation map that increases running performance compared with the first running mode is applied,
wherein the vehicle controller limits electric power generation of the electric power generating mechanism under a first condition when the buffering coupling is applied during the first running mode and limits electric power generation of the electric power generating mechanism under a second condition that is less limited than the first condition when the buffering coupling is applied during the second running mode.

2. The hybrid electric vehicle according to claim 1,
wherein an electric power limit under the second condition comprises a larger value than an electric power limit under the first condition, and
wherein a change limit under the second condition is larger than a change limit under the first condition.

3. The hybrid electric vehicle according to claim 1,
wherein an electric power limit under the second condition changes in accordance with a cooling status of the engine.

4. The hybrid electric vehicle according to claim 2,
wherein the electric power limit under the second condition changes in accordance with a cooling status of the engine.

5. The hybrid electric vehicle according to claim 1, further comprising:
a charge/discharge controller configured to control charge and discharge of the battery,
wherein the charge/discharge controller increases a range from a lower limit value to an upper limit value during the second running mode compared with during the first running mode, the lower limit value being a lower limit value of a state of charge to which the battery is dischargeable, the upper limit value being an upper limit value of the state of charge to which the battery is chargeable.

6. The hybrid electric vehicle according to claim 2, further comprising:
a charge/discharge controller configured to control charge and discharge of the battery,
wherein the charge/discharge controller increases a range from a lower limit value to an upper limit value during the second running mode compared with during the first running mode, the lower limit value being a lower limit value of a state of charge to which the battery is dischargeable, the upper limit value being an upper limit value of the state of charge to which the battery is chargeable.

7. The hybrid electric vehicle according to claim 3, further comprising:
a charge/discharge controller configured to control charge and discharge of the battery,
wherein the charge/discharge controller increases a range from a lower limit value to an upper limit value during the second running mode compared with during the first running mode, the lower limit value being a lower limit value of a state of charge to which the battery is dischargeable, the upper limit value being an upper limit value of the state of charge to which the battery is chargeable.

8. The hybrid electric vehicle according to claim 4, further comprising:
a charge/discharge controller configured to control charge and discharge of the battery,
wherein the charge/discharge controller increases a range from a lower limit value to an upper limit value during the second running mode compared with during the first running mode, the lower limit value being a lower limit value of a state of charge to which the battery is dischargeable, the upper limit value being an upper limit value of the state of charge to which the battery is chargeable.

9. The hybrid electric vehicle according to claim 1, wherein the vehicle controller permits stopping of the engine during the first running mode, prohibits the stopping of the engine during the second running mode and, delays a timing at which the stopping of the engine is switched to be permitted when the second running mode is switched to the first running mode.

10. The hybrid electric vehicle according to claim 2, wherein the vehicle controller permits stopping of the engine during the first running mode, prohibits the stopping of the engine during the second running mode and, delays a timing at which the stopping of the engine is switched to be permitted when the second running mode is switched to the first running mode.

11. The hybrid electric vehicle according to claim 3, wherein the vehicle controller permits stopping of the engine during the first running mode, prohibits the stopping of the engine during the second running mode and, delays a timing at which the stopping of the engine is switched to be permitted when the second running mode is switched to the first running mode.

12. The hybrid electric vehicle according to claim 4, wherein the vehicle controller permits stopping of the engine during the first running mode, prohibits the stopping of the engine during the second running mode and, delays a timing at which the stopping of the engine is switched to be permitted when the second running mode is switched to the first running mode.

13. The hybrid electric vehicle according to claim 5, wherein the vehicle controller permits stopping of the engine during the first running mode, prohibits the stopping of the engine during the second running mode and, delays a timing at which the stopping of the engine is switched to be permitted when the second running mode is switched to the first running mode.

14. The hybrid electric vehicle according to claim 6, wherein the vehicle controller permits stopping of the engine during the first running mode, prohibits the stopping of the engine during the second running mode and, delays a timing at which the stopping of the engine is switched to be permitted when the second running mode is switched to the first running mode.

15. The hybrid electric vehicle according to claim 7, wherein the vehicle controller permits stopping of the engine during the first running mode, prohibits the stopping of the engine during the second running mode and, delays a timing at which the stopping of the engine is switched to be permitted when the second running mode is switched to the first running mode.

16. The hybrid electric vehicle according to claim 8, wherein the vehicle controller permits stopping of the engine during the first running mode, prohibits the stopping of the engine during the second running mode and, delays a timing at which the stopping of the engine is switched to be permitted when the second running mode is switched to the first running mode.

17. A hybrid electric vehicle comprising:
an engine and a motor configured to drive driving wheels;
a battery configured to supply electric power for running to the motor;
a coupling mechanism that is located on a torque transmission route between the engine and the driving wheels and configured to switch coupling of the engine and the driving wheels between direct coupling and buffering coupling;
an electric power generating mechanism configured to generate electric power from torque transmitted from the engine via the coupling mechanism; and
circuitry configured to
switch a running mode of the hybrid electric vehicle between a first running mode and a second running mode to which an accelerator operation map that increases running performance compared with the first running mode is applied, and
limit electric power generation of the electric power generating mechanism under a first condition when the buffering coupling is applied during the first running mode and limit electric power generation of the electric power generating mechanism under a second condition that is less limited than the first condition when the buffering coupling is applied during the second running mode.

* * * * *